Dec. 2, 1941.  J. R. HARTLEY  2,264,796
OPEN NOZZLE
Filed July 26, 1940    3 Sheets-Sheet 1

JOHN R. HARTLEY
INVENTOR

BY
Harry Dexter Beck
ATTORNEY

Dec. 2, 1941.  J. R. HARTLEY  2,264,796
OPEN NOZZLE
Filed July 26, 1940  3 Sheets-Sheet 2

JOHN R. HARTLEY
INVENTOR

BY Harry Dexter Peck
ATTORNEY

Dec. 2, 1941.  J. R. HARTLEY  2,264,796
OPEN NOZZLE
Filed July 26, 1940  3 Sheets-Sheet 3
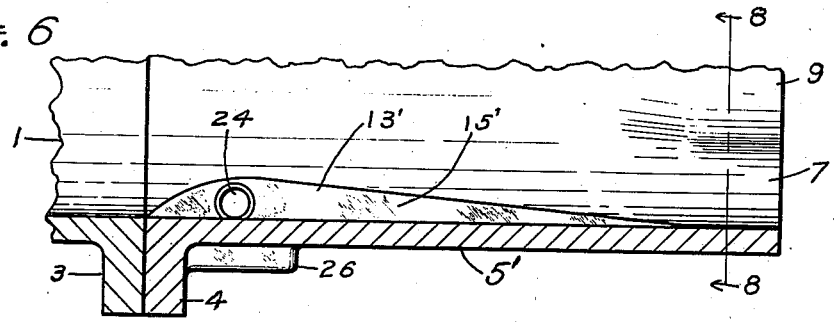
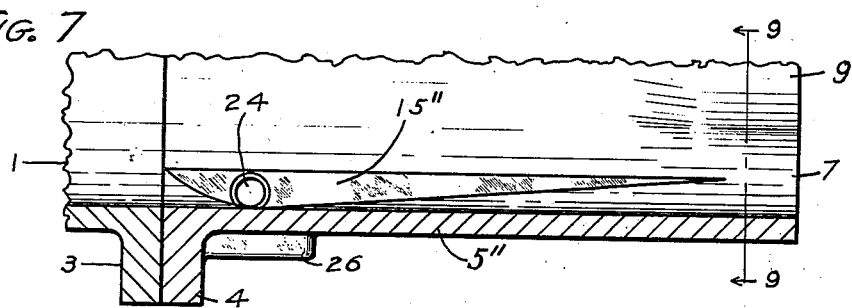
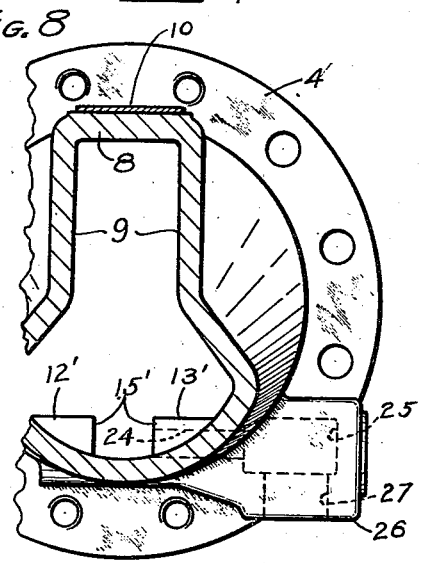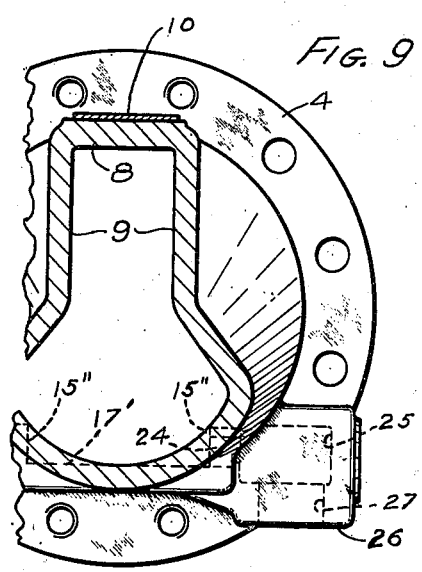
JOHN R. HARTLEY
INVENTOR
BY Harry Dexter Peck
ATTORNEY Patented Dec. 2, 1941

2,264,796

UNITED STATES PATENT OFFICE 2,264,796

OPEN NOZZLE

John R. Hartley, Barrington, R. I., assignor to Builders Iron Foundry, Providence, R. I., a corporation of Rhode Island Application July 26, 1940, Serial No. 347,699

5 Claims. (Cl. 73—215)

This invention relates to improvements in open nozzles. More especially it has to do with an open nozzle such as is disclosed in Letters Patent No. 2,100,219 granted November 23, 1937, and in particular is directed to an improved arrangement of the piezometer connection to the bottom of the nozzle.

Open nozzles are particularly useful for indicating the rate of flow in a discharge conduit of liquid containing foreign matter, such as sewage or the like. Such a nozzle is constructed in the form of a flume of such shape that the depth of liquid flowing through it has a predetermined relation to the flow rate. The static pressure of the liquid is transmitted from the nozzle to an instrument calibrated to indicate the rate of flow. The nozzle disclosed in the patent above mentioned is characterized by the fact that the said static pressure has substantially a lineal relation to the flow rate. This important characteristic is retained in the improved nozzle herein set forth.

It is an object of this invention to provide a pressure connection from the bottom of the nozzle, having its port in a vertical wall. The provision of the port as stated results in a more uniformly correct transmission of the static pressure and a more uniformly correct indication of the liquid flowing through the conduit. An additional feature of my invention is to so shape the bottom portion of the nozzle that the reduction of flow area, due to the provision of the aforesaid vertical wall, is fully compensated for.

The best mode in which I have contemplated applying the principles of my improvements is shown in the accompanying drawings, but these are to be deemed merely illustrative because it is intended that the patent shall cover by suitable expression in the appended claims whatever features of patentable novelty are herein disclosed.

In the drawings:

Figure 6 is a partial longitudinal section showing a modified arrangement;

Figure 7 is a partial section like Figure 6 but showing still another modification;

Figure 8 is a partial vertical section, taken as on line 8—8 of Figure 6; and

Figure 9 is a like section, taken as on line 9—9 of Figure 7.

Figure 1:
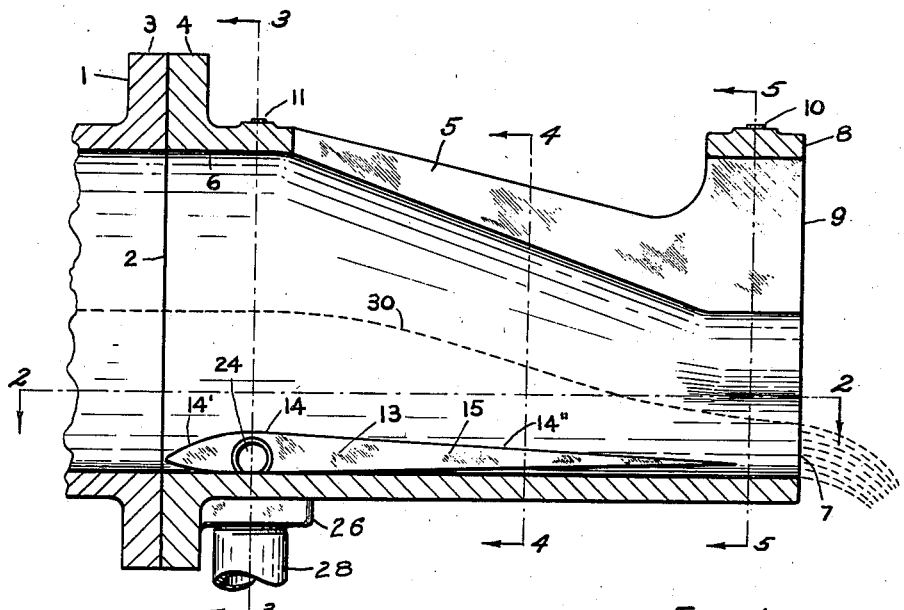
Figure 1 is a vertical longitudinal section along the axis of an open nozzle embodying my improvements.
Figure 2:
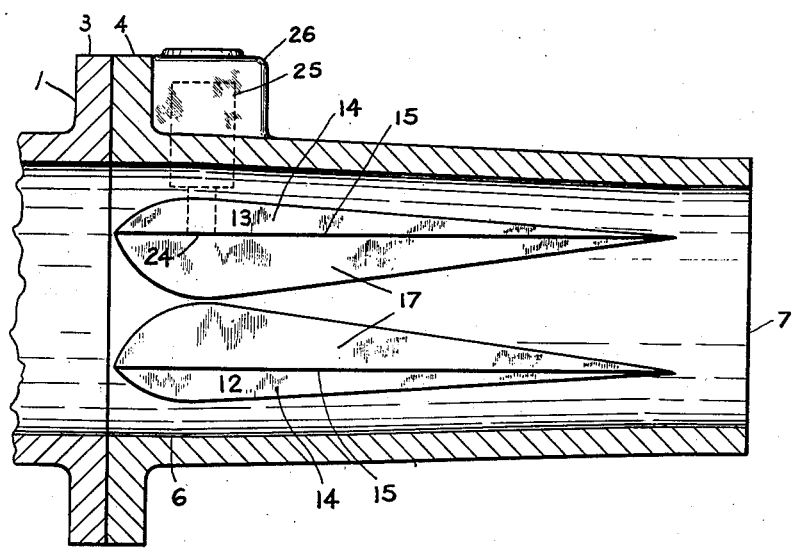
Figure 2 is a horizontal section taken as on line 2—2 of Figure 1.

Referring to the drawings, the ordinary pipe conduit 1 has a circular outlet 2 customarily provided with an integral or attached flange 3. To this is secured the flange 4 of my improved open nozzle 5. At its flanged inlet there is a short entirely enclosed substantially cylindrical portion 6 the entrance to which is of the same shape and size as the outlet 2 from the pipe conduit. Beyond this substantially cylindrical portion 6, the nozzle is open at the top, except at the discharge end 7 where a bridge piece 8 is provided across the vertically extended side walls 9. On this bridge piece is a leveling plate 10 whose surface is the same distance from the longitudinal axis of the nozzle as is a corresponding leveling plate 11 provided on a flat boss on the upper outer side of the cylindrical portion 6. These leveling plates are provided for convenience in applying a spirit level to insure its installation of the nozzle in the proper horizontal position.

Heretofore, it has been customary to provide a pressure port at the very bottom of the nozzle by means of which the static pressure of the dirty liquid flowing past the port can be transmitted to an instrument, such as for example a suitable calibrated glass tube. A pipe is usually secured in the port so that liquid from the conduit will stand in the pipe and at a level in the indicating instrument corresponding to the static pressure or depth of the flowing liquid in the nozzle. Such a port at the bottom of the conduit, with a pipe depending vertically therefrom, provides a perfectly located trap for foreign matter which may be deposited from the dirty liquid. The collection of this deposit adversely effects the indication of the rate of flow and frequent cleanings of the bottom hole and pipe may be necessary.

In my improved arrangement, a pressure port with its opening in a horizontal plane is entirely avoided, because it is a major feature of my invention to provide a vertical surface close by the bottom of the nozzle in which is a port with its opening in a vertical plane. Such a vertical surface may be provided simply by making a protuberance from the nozzle wall and have its side surface stand vertically upward from the normal curved inner surface of the nozzle. Or the wall may be cut away to provide a vertical surface and a horizontal surface within the nozzle wall itself, with no protuberance outside the normal curvature. In the preferred arrangement I provide both a protuberance from the nozzle wall and also cut the wall away, so that the portion of the flow space occupied by the protuberance is compensated for by the space gained by cutting away the wall.

The preferred arrangement is particularly shown in Figs. 1 to 5. At the bottom of open nozzle, within the enclosed circular portion 6, I provide protuberances 12 and 13 which extend longitudinally throughout substantially the entire length of the nozzle. When viewed from the side as seen in Figure 1 a protuberance appears fish-shaped or streamlined, with its top surface 14 rising rather abruptly on a smooth curve as at 14', and then very slowly falling off or dropping gradually as at 14" toward the discharged end.

The inner face of each protuberance is a vertical wall 15 of varying height. In the preferred arrangement shown, this varying height results not only from the varying slope of the top surface 14 but is also due to a varying bottom boundary surface 17. This is formed by removal, as it were, of material from the bottom portion of the nozzle wall throughout the longitudinal extent of the protuberance. The space thus added to the flow area by the removal of material from the nozzle wall offsets the loss of flow area due to the presence of the protuberance.

Figure 3:
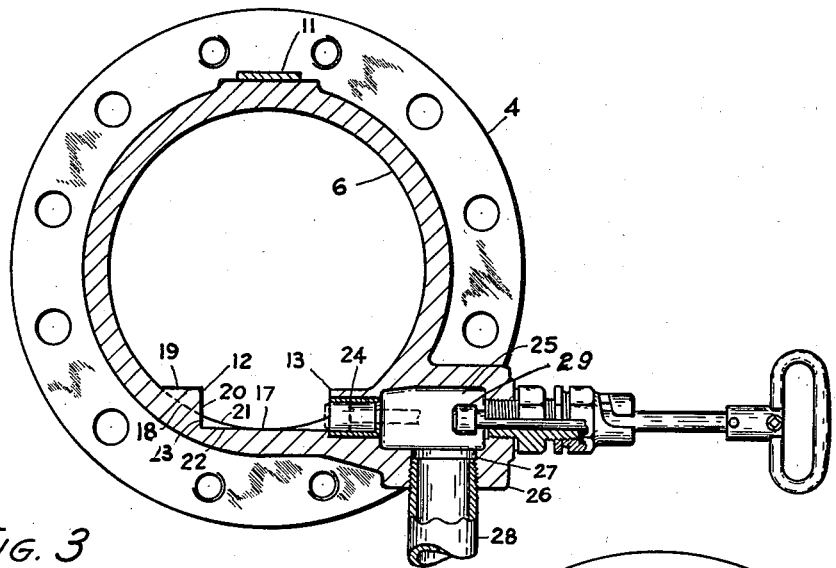
Figure 3 is a vertical section, taken as on line 3—3 of Figure 1.
Figure 4:
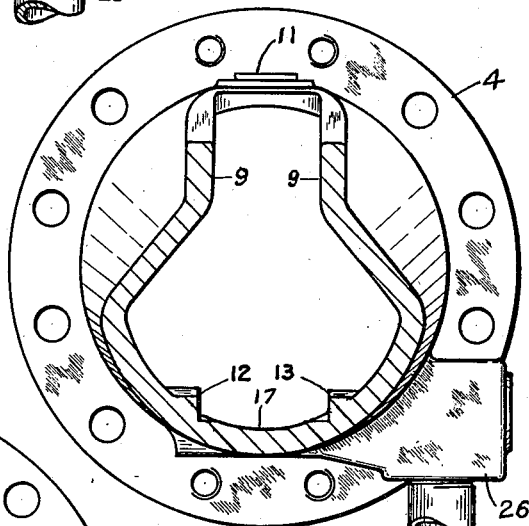
Figure 4 is another vertical section taken as on line 4—4 of Figure 1.
Figure 5:
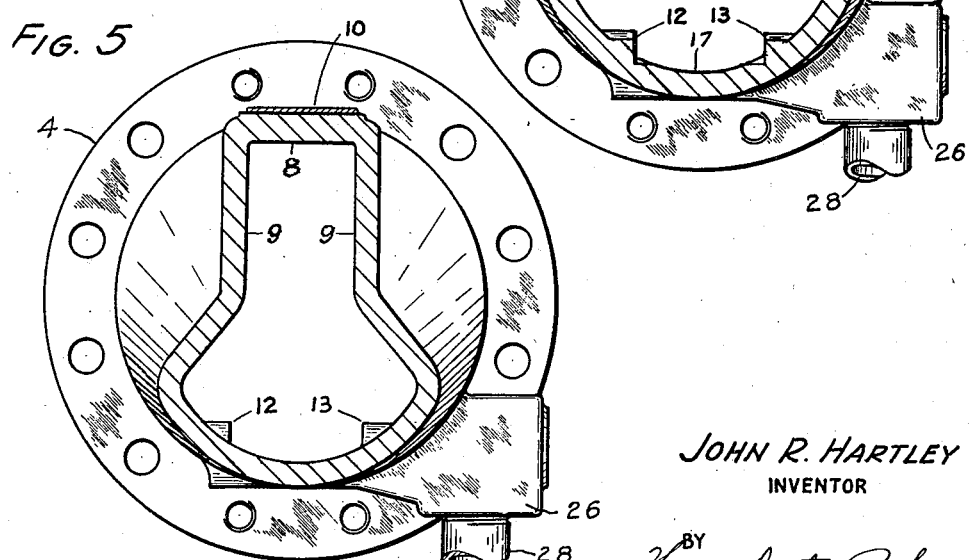
Figure 5 is still another vertical section taken as on line 5—5 of Figure 1.

To make this clear, attention is directed to Figure 3 and particularly to the protuberance 12. The area confined between the dotted line 18, the horizontal line 19 and the vertical line 20 extending upward from the dotted line, may be said to represent at this cross-section the space occupied by the protuberance 12. In like manner the area between the curved line 21, the horizontal line 22 and vertical line 23 extending upward to this curved line, may be said to represent the space gained by removal of material from the bottom wall of the nozzle adjacent to the protuberance 12. These two areas, or spaces, are substantially equal and thus it follows that the portion of the normally circular flow area which is occupied by the protuberance 12 is compensated for by the flow area added by the removal of material from the bottom wall of the nozzle. The particular section shown in Figure 3 is at the portion of the nozzle where the height of the protuberances is greatest and where the largest amount of material is removed from the bottom wall. As the height of the protuberance increases so does the depth of the depressed bottom increase, and as the height of the protuberance lessens so does the depth of the cut into the bottom. Hence throughout the nozzle, the effective flow area is maintained substantially the same as with former designs without my improved arrangement of the pressure port.

In the preferred arrangement shown, where the vertical face is formed in part by the protuberance and in part by the cutting away of the material, I provide at substantially the greatest vertical extent of the vertical face a horizontal pressure port 24 in the face of a protuberance. This port extends into a chamber 25 formed in a boss 26 on the nozzle, at the bottom of which is a threaded hole 27 to receive a pipe 28. The latter is connected to an indicating instrument not shown. Screwed into the boss, in alignment with the axis of the port 24 is cleaning means comprising a plunger 29 which can be pushed through the outlet, as shown in dotted outline in Figure 3, for thoroughly removing any dirt or foreign matter that may in time lodge therein. Ordinarily this plunger is retracted to the position shown in full lines in Figure 3.

As the liquid flows through the nozzle, and particularly the enclosed cylindrical portion 6 thereof, the static pressure corresponding to the depth of liquid (which may be at some level such as is indicated by the dot-and-dash line 30), is transmitted by the liquid standing in the port 24, the chamber 25 and the connection represented by pipe 28 to maintain a level in an instrument (not shown) by which the rate of flow through the nozzle is indicated. This rate of flow is the same as though the circular wall of the portion 6 were undisturbed, since, as before described, the over-all flow area of the nozzle is not changed because what is apparently taken away by the protuberances 12 and 13 is compensated for by the material removed from the bottom wall of the nozzle between these protuberances. The streamline shape of the latter is important in that it avoids eddying and turbulence and effects a smooth uniform flow past the port 24.

As previously suggested a vertical wall with horizontally disposed port might otherwise be provided. In Figures 6 and 8 is shown a nozzle 5' with opposed streamlined protuberances 12' and 13' imposed on the otherwise normally curved bottom portion of the nozzle. Each protuberance provides a vertical face 15' in one of which is the opening of the port 24 leading to the chamber 25 and outlet 27 of the boss 26. In Figures 7 and 9 vertical walls 15" are provided by cutting away material from the wall of the nozzle 5" at the bottom to form a surface 17'. In one of these vertical walls is the opening to port 24. In both of these modifications the same port-cleaning means may be employed as is fully illustrated in Figure 3, but I have not deemed it necessary to show such means in Figures 8 or 9. Moreover, in these modifications, any material variation in the flow area, due to the protuberances 12' and 13' in one case, or the cut-away material from the pipe wall in the other case may be compensated for by changing radius of curvature of the nozzle wall so that the flow area as a whole is substantially undisturbed in extent.

I claim:

1. An open nozzle for liquid discharge from a conduit wherein the static pressure of the flowing liquid corresponds with the rate of flow; a protuberance projecting into the flow area of said nozzle providing a vertically disposed surface; and there being a horizontally disposed port having its opening in said vertical surface for transmission of said pressure to measuring apparatus; the bottom of the nozzle wall being cut away adjacent said protuberance to compensate for the flow area occupied by the protuberance, thereby maintaining undisturbed the effective flow area throughout said nozzle.

2. An open nozzle for liquid discharge from a conduit wherein the static pressure of the flowing liquid corresponds with the rate of flow; a protuberance near the bottom of said nozzle projecting into the flow area, having a horizontally disposed streamlined surface and a vertically disposed surface coextensive in the direction of flow; the said horizontal surface rising from near the bottom of the nozzle and then sloping gently toward the bottom to close by the discharge end and the vertical surface likewise increasing to maximum extent and then decreasing gradually toward the discharge end; and there being an outlet port having its opening in the vertical surface at substantially its point of maximum extent whereby the pressure of the flowing liquid can be transmitted to measuring apparatus; the bottom of said nozzle wall being cut away to form a horizontally disposed surface extending along the bottom edge of the vertical surface so that the space provided by said cutway material substantially equals to the space occupied by said protuberance whereby the effective flow area throughout the nozzle remains undisturbed.

3. An open nozzle for liquid discharge from a conduit, having a closed circular portion adjacent the conduit wherein the static pressure of the flowing liquid corresponds with the rate of liquid flowing, and having an open trough-like portion beyond said circular portion in the direction of flow; a protuberance outstanding in the flow area adjacent the bottom of the nozzle and extending substantially throughout said nozzle portions; said protuberance having a vertical surface in which is the opening of a horizontally disposed port through which said pressure may be transmitted to measuring apparatus; and the bottom wall of the nozzle portions being removed to compensate for the space of the flow area occupied by said protuberance whereby the effective flow area through the nozzle is undisturbed.

4. An open nozzle for liquid discharge from a conduit, having a closed circular portion adjacent the conduit wherein the static pressure of the flowing liquid corresponds with the rate of liquid flowing, and having an open trough-like portion beyond said circular portion in the direction of flow; a protuberance outstanding in the flow area adjacent the bottom of the nozzle and extending substantially through said nozzle portions; said protuberance having a horizontally disposed streamlined top surface rising from near the bottom of the nozzle and then sloping gently toward the bottom in the direction of flow, and having a vertically disposed side surface coextensive with said top surface in the direction of flow; the said vertical surface increasing to a maximum extent and then decreasing gradually along the direction of flow; there being a horizontally disposed port in said protuberance having its opening in said vertical surface at substantially its point of maximum extent; and the bottom wall of the nozzle portions being removed to compensate for the space of the flow area occupied by said protuberance whereby the effective flow area through the nozzle is undisturbed.

5. An open nozzle for liquid discharge from a conduit wherein the static pressure of the flowing liquid corresponds with the rate of flow; opposed protuberances projecting into the flow area of said nozzle providing vertically disposed parallel surfaces extending in the direction of flow; and there being a horizontally disposed port having its opening in one of said vertical surfaces for transmission of said pressure to measuring apparatus; the bottom of the nozzle wall being shaped to compensate for the flow area occupied by the protuberances, thereby maintaining undisturbed the effective flow area throughout said nozzle.

JOHN R. HARTLEY.